(12) United States Patent
Klaas

(10) Patent No.: US 9,279,669 B2
(45) Date of Patent: Mar. 8, 2016

(54) OPTICAL MEASURING DEVICE WITH A SLIDER AND OPTICAL MEASUREMENT METHOD

(71) Applicant: Airbus Operations GmbH, Hamburg (DE)

(72) Inventor: Andrej Klaas, Hamburg (DE)

(73) Assignee: Airbus Operations GmbH (DE)

( * ) Notice: Subject to any disclaimer, the term of this patent is extended or adjusted under 35 U.S.C. 154(b) by 374 days.

(21) Appl. No.: 13/888,536

(22) Filed: May 7, 2013

(65) Prior Publication Data

US 2013/0300862 A1 Nov. 14, 2013

Related U.S. Application Data

(60) Provisional application No. 61/643,960, filed on May 8, 2012.

(30) Foreign Application Priority Data

May 8, 2012 (DE) .......................... 10 2012 008 905

(51) Int. Cl.
*H04N 11/24* (2006.01)
*G01B 11/24* (2006.01)
*G01C 11/06* (2006.01)

(52) U.S. Cl.
CPC ................ *G01B 11/24* (2013.01); *G01C 11/06* (2013.01)

(58) Field of Classification Search
CPC ....................................................... G01B 11/24
USPC ............ 348/47, 180, 187, 139; 356/601, 620; 248/168
See application file for complete search history.

(56) References Cited

U.S. PATENT DOCUMENTS

| 1,955,116 | A | | 4/1934 | Duchatellier |
| 4,396,945 | A | * | 8/1983 | DiMatteo et al. ............. 348/139 |
| 5,440,392 | A | * | 8/1995 | Pettersen et al. ............. 356/620 |
| 5,647,565 | A | * | 7/1997 | Wei ............................. 248/168 |
| 5,729,475 | A | * | 3/1998 | Romanik, Jr. ................. 702/150 |
| 5,973,788 | A | * | 10/1999 | Pettersen et al. ............. 356/614 |
| 6,175,647 | B1 | * | 1/2001 | Schick et al. ................. 382/154 |
| 6,377,701 | B1 | | 4/2002 | Ohki |

(Continued)

FOREIGN PATENT DOCUMENTS

| CN | 101853528 A | 10/2010 |
| CN | 102003946 A | 4/2011 |

(Continued)

OTHER PUBLICATIONS

Chinese Office Action dated May 19, 2015.

*Primary Examiner* — Paulos M Natnael
(74) *Attorney, Agent, or Firm* — Lerner, David, Littenberg, Krumholz & Mentlik, LLP

(57) ABSTRACT

An optical measuring device for measuring a surface contour of an object, includes a tripod on which a camera platform is mounted, wherein on the camera platform at least two photo cameras are arranged for imaging the object comprising marking elements, and the at least two photo cameras are arranged on the camera platform in such a manner that imaging the object can be carried out from two different perspectives, wherein between the camera platform and the tripod a displacement device for the linear displacement of the camera platform in three directions that are independent of each other is arranged.

8 Claims, 1 Drawing Sheet

(56) References Cited

U.S. PATENT DOCUMENTS

| | | | |
|---|---|---|---|
| 6,466,325 B1 * | 10/2002 | Gooch | 356/620 |
| 2002/0023478 A1 * | 2/2002 | Pryor | 73/1.01 |
| 2006/0227210 A1 * | 10/2006 | Raab et al. | 348/139 |
| 2007/0018327 A1 | 1/2007 | Fujiwara et al. | |
| 2009/0315288 A1 * | 12/2009 | Hernandez | 280/79.3 |
| 2012/0069149 A1 | 3/2012 | Masuda | |

FOREIGN PATENT DOCUMENTS

| | | |
|---|---|---|
| DE | 102006020027 A1 | 11/2006 |
| EP | 1759166 A2 | 3/2007 |
| GB | 1 086 633 A | 10/1967 |
| JP | 2009-002912 A | 1/2009 |
| WO | 2006069748 A1 | 7/2006 |

* cited by examiner

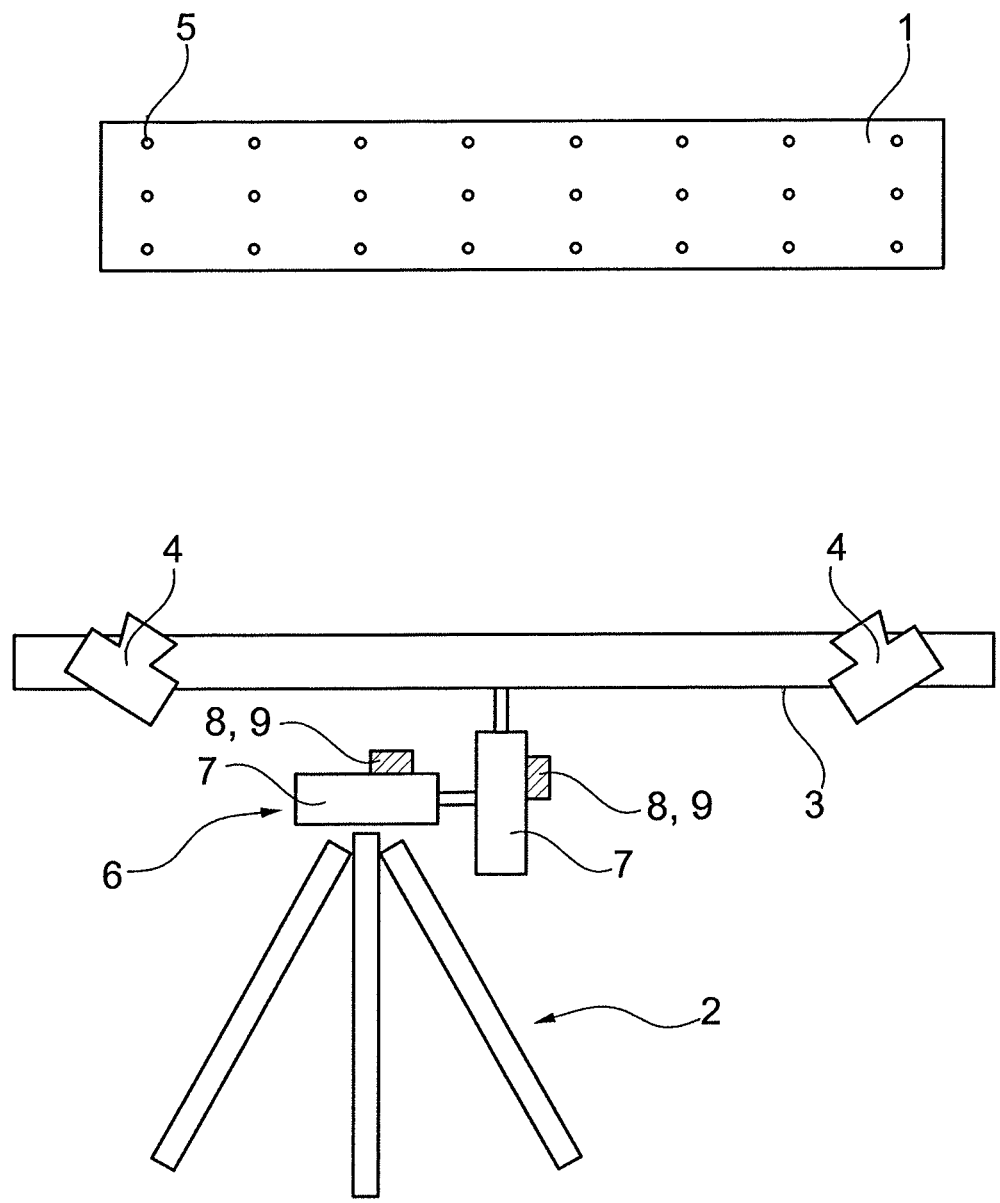

OPTICAL MEASURING DEVICE WITH A SLIDER AND OPTICAL MEASUREMENT METHOD

CROSS-REFERENCE TO RELATED APPLICATIONS

This application claims the benefit of the filing date of U.S. Provisional Patent Application No. 61/643,960 filed May 8, 2012, the disclosure of which is hereby incorporated herein by reference.

TECHNICAL FIELD

The invention relates to an optical measuring device for measuring a surface contour of an object, comprising a tripod on which a camera platform is mounted, wherein on the camera platform at least two photo cameras are arranged for imaging the object comprising marking elements, and the at least two photo cameras are arranged on the camera platform in such a manner that imaging the object can be carried out from two different perspectives. Furthermore, the invention relates to an optical measuring method for measuring a surface contour of an object by means of such a measuring device.

The field of the invention relates to optical measuring technology, in particular to image-processing-based optical measuring technology such a photogrammetry. Photogrammetry is a method for measuring objects according to their position and shape. In this method measuring does not take place directly on the object to be measured, but instead indirectly on previously taken measuring images of the object to be measured. From the measuring images it is then possible to determine the spatial position or the three-dimensional shape. Such a measuring method can also be used for measuring displacements and deformations.

BACKGROUND OF THE INVENTION

From US 2007 018 327 a method for measuring a surface of a component is known, which method uses the photogrammetry method and the laser-tracking method for measuring the surface. In the method disclosed in the aforesaid, a camera is moved along a path, wherein a multitude of images of the surface of a component are recorded from different angles of view. Furthermore, at each point in time of recording an image the position of the camera is recorded.

In this method in a first step a first set of measurement data is generated by measuring the surface with two cameras, wherein photogrammetry is used. In a second step a second set of measurement data is generated by measuring the surface with a laser tracker. In a third step the data for the camera positions is determined with the use of the laser tracker. Finally, the first set of measurement data and the second set of measurement data are superimposed together with the data relating to the camera position.

In addition to the method for measuring the surface of a component, the printed publication discloses a system for measuring the surface of a component. This system comprises a slide that moves along a path. On the slide, cameras are arranged so as to be fixed in position, which cameras on various positions along the path take images of the surface of the component. In addition, a projector and reflective targets are mounted on the slide, wherein the projector generates an illumination pattern on the surface of the component. The reflective targets are also mounted on the surface of the component, which surface is to be measured, and are used by the statically held laser tracker for measuring the position of the surface of the component, and for measuring the position of the slide at the point in time the respective image is taken.

The generally-known state of the art shows that optical measuring methods based on image processing are used for measuring displacements and deformations. In these methods the object to be measured comprises suitable markings, and an optical structure for taking images with cameras that are positioned so as to be fixed relative to each other. The accuracy of the measuring results depends on this optical design, the nature of the object markings and the illumination conditions. At present there is no calibration method that takes into account these factors of influence.

In the hitherto-used calibration methods a measuring arrangement is produced in a calibration laboratory. Subsequently, calibration objects are measured. This method is associated with disadvantages in that, on the one hand, the setup in the laboratory takes place under ideal conditions so that the calibration setup usually has more favorable characteristics than a real measuring arrangement, and, on the other hand, most of the time the calibration objects do not cover the entire possible measuring volume.

BRIEF SUMMARY OF THE INVENTION

An aspect of the present invention for a given real-life experimental setup is directed to carrying out calibration that is traceable to calibration standards, and to determining the measuring uncertainty in relation to each measuring point on the object to be measured. In this arrangement all the boundary conditions present during measuring in structural experiments may be taken into account, including the influence of environmental conditions or ambient conditions and of operating personnel.

An aspect of the invention includes the technical teaching according to which, between the camera platform and the tripod, a displacement device for the linear displacement of the camera platform in three directions that are independent of each other is arranged. Preferably, the displacement device can be moved in three directions that are perpendicular to each other and that correspond to the spatial axes.

For automatic travel, compact stepper motors comprising an electrical drive may be arranged on the displacement device. Likewise it is imaginable to use pneumatic or hydraulic stepper motors that result in precise displacement. The stepper motors are preferably controlled by way of a computer system that is connected to the stepper motors.

Advantageously the displacement device is of a compact and stable design. The stability of the displacement device is to be emphasized in particular, because the camera platform, including the two photo cameras, is not only to be supported but also to be moved in a safe and reliable manner. Furthermore, the displacement device is attached, by way of a screw connection, to the tripod and to the camera platform. Further connection options could include integral connections, for example welded connections.

According to an embodiment of the invention, the displacement device comprises three precision slide guides that operate perpendicularly in relation to each other, wherein each of the three precision slide guides comprises a calibrated measuring system for measuring the displacement path. It is furthermore preferred if the calibrated measuring system is a caliper gauge and/or a micrometer screw. By means of the calibrated measuring system it is thus possible to determine the displacement of the photo cameras precisely, easily and reliably. Furthermore, the caliper gauge is used for coarse adjustment, and the micrometer screw is used for fine adjustment, wherein a series connection of the two calibrated measuring systems is imaginable.

The object to be measured can, for example, be an aircraft component. Such aircraft components, can, in particular, include landing flaps, aircraft fuselages, vertical stabilizers, and wings. Furthermore, large-area optical measuring of other objects, for example test jigs, is also imaginable. When subjecting these objects to loads, it is possible for buckling and bulging to occur, which can be acquired in a non-contacting manner by means of the measuring method.

According to a measure of the invention, it is proposed that the displacement device forms an integral part of the measuring device. Thus, the measuring device makes it possible to carry out calibration by means of the displacement device. Instead of placing calibration objects of known dimensions in the entire measuring region as is the case in the hitherto-used calibration methods, according to an embodiment of the invention, images of the measurement object are used for calibration.

BRIEF DESCRIPTION OF THE DRAWING

Further measures of the invention are presented below with reference to the sole FIGURE, together with the description of a preferred embodiment of the invention.

The sole FIGURE depicts a diagrammatic view of the optical measuring device according to an embodiment of the invention.

DETAILED DESCRIPTION

According to the sole FIGURE, the optical measuring device comprises a tripod 2 on which, by way of a displacement device 6, a camera platform 3 is mounted. On the camera platform 3 two photo cameras 4 are arranged for taking images of an object 1 that comprises marking elements 5. The two photo cameras 4 are arranged on the camera platform 3 in such a manner that taking images of the object from two different perspectives is possible. The displacement device 6 comprises three precision slide guides 7, which operate perpendicularly to each other. Each of the three precision slide guides 7 comprises a calibrated measuring system, for example a caliper gauge 8 and/or a micrometer screw 9, for measuring the displacement path. In this preferred embodiment the calibrated measuring system has a series connection comprising the caliper gauge 8 and the micrometer screw 9. Coarse adjustment takes place by way of the caliper gauge 8, and fine adjustment takes place by way of the micrometer screw 9.

Following alignment of the photo cameras 4 relative to each other and to the object 1 to be measured, and following marking of the object 1 by means of marking elements 5, immediately prior to measuring the object 1, calibration of the optical measuring device is carried out. To this effect, for each image, the photo cameras 4 are moved by a defined distance to the three directions that are perpendicular to each other. In this process, images of the object 1 are taken at commencement of measuring and after each travel path covered. Displacement of the photo cameras 4 is measured by means of the caliper gauge 8. Calibration of the optical measuring device makes it possible to take into account the precise measuring conditions, for example illumination conditions, temperature and operating personnel, in order to determine the measuring uncertainty at each measuring point. In this way proof of calibration that is traceable to calibration standards takes place.

During calibration of the optical measuring device each of the three precision slide guides 7 is displaced in several increments up to a displacement width, which corresponds to the maximum object deformation to be measured, of the object 1 to be measured. For example, when measuring the oscillation of an aircraft wing, the maximum oscillation amplitude should be taken into account. It is thus ensured that the previously mentioned measuring uncertainties are valid for the entire deformation state of the object 1 to be measured, which deformation state occurs during measuring.

On the image recorded by the photo cameras 4 it looks as though the entire object 1 to be measured had moved by the increment shown by the caliper gauge 8. Thus at each position of the object 1 to be measured a displacement value can be measured that comprises the negative displacement of the camera platform 3 and a random location-dependent noise. As a result of the recording of several images and the statistical evaluation of the images, at each point of the object 1 to be measured, and for each movement direction, a systematic deviation and a scatter can be determined. Furthermore, by way of calibration of the caliper gauge 8, proof can be furnished that the measured values determined by means of the optical measuring method are correct.

An optical measuring method of this type can, in particular, be used for verification tests relating to static strength. In this process the objects 1 to be measured are subjected to loads; images are taken prior to, during and after loading; and the images are evaluated.

Furthermore, it is also possible, within the framework of quality control, to check the objects 1 to be measured by means of the measuring device according to an embodiment of the invention. In this process it is possible, for example after calibration of the measuring device, to precisely determine the surface contour of the object 1 to be measured, wherein the measuring uncertainty relating to each measuring point on the object 1 to be measured can be determined.

The invention is not limited to the above-described preferred exemplary embodiment. Instead, modifications thereof are also imaginable, which modifications are within the protective scope of the following claims. For example, it is also possible, instead of the photo cameras 4, to utilize a sensor that is similar to the photo cameras 4 in order to take images of the surface contour of the object 1.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Object
2 Tripod
3 Camera platform
4 Camera
5 Marking element
6 Displacement device
7 Precision slide guide
8 Caliper gauge
9 Micrometer screw

The invention claimed is:
1. An optical measuring device for measuring a surface contour of an object, comprising:

a tripod;

a camera platform mounted on the tripod;

at least first and second photo cameras arranged on the camera platform for imaging the object comprising marking elements, wherein the at least first and second photo cameras are arranged on the camera platform to carry out imaging the object from first and second different perspectives; and a displacement device arranged between the platform and the tripod for the linear displacement of the camera platform in three directions independent of each other, wherein the displacement device comprises first, second and third precision slide guides operating perpendicularly in relation to each other, wherein each of the first, second and third precision slide guides comprises a calibrated measuring system for measuring the displacement path.

2. The measuring device of claim 1, wherein the displacement device is configured to be moved in three directions perpendicular to each other and corresponding to the spatial axes.

3. The measuring device of claim a1, wherein the calibrated measuring system is at least one of a caliper gauge and a micrometer screw.

4. The measuring device of claim 1, wherein the displacement device is an integral part of the measuring device.

5. The measuring device of claim 1, wherein the object to be measured is an aircraft component.

6. An optical measuring method for measuring a surface contour of an object by a measuring device, wherein on a tripod a camera platform is mounted, and on the camera platform at least first and second photo cameras are arranged for imaging the object comprising marking elements, wherein the at least first and second photo cameras are arranged on the camera platform in such a manner that imaging the object can be carried out from two different perspectives, wherein prior to each measuring process, calibration of the optical measuring device is carried out, taking into account the precise measuring conditions, to determine the measuring uncertainty at each measuring point and to provide proof of calibration traceable to calibration standards, wherein the camera platform is moved, by a displacement device arranged between the tripod and the camera platform, with first, second and third precision slide guides operating perpendicularly in relation to each other in three perpendicular directions corresponding to the spatial axes, and wherein images of the object to be measured are taken at commencement of measuring and after each travel path covered.

7. The measuring method of claim 6, wherein prior to each measuring process the at least first and second photo cameras are arranged relative to each other and to the object to be measured, wherein the object to be measured is marked by means of marking elements.

8. The measuring method of claim 6, wherein during calibration of the optical measuring device each of the first, second and third precision slide guides is displaced in several increments up to a displacement width, corresponding to the maximum object deformation to be measured, of the object to be measured.

\* \* \* \* \*